United States Patent [19]

Kosich

[11] Patent Number: 4,924,488
[45] Date of Patent: * May 8, 1990

[54] MULTILINE COMPUTERIZED TELEPHONE MONITORING SYSTEM

[75] Inventor: Milo Kosich, Cuyahoga Falls, Ohio

[73] Assignee: Enforcement Support Incorporated, Cuyahoga Falls, Ohio

[*] Notice: The portion of the term of this patent subsequent to Mar. 21, 2006 has been disclaimed.

[21] Appl. No.: 314,449

[22] Filed: Feb. 23, 1989

Related U.S. Application Data

[63] Continuation-in-part of Ser. No. 78,593, Jul. 28, 1987, Pat. No. 4,815,120.

[51] Int. Cl.$^5$ .................. H04M 15/04; H04M 15/18; H04M 15/22; H04M 3/22
[52] U.S. Cl. .................................. 379/34; 379/113; 379/135; 379/136
[58] Field of Search ................... 379/34, 35, 112, 113, 379/135, 136

[56] References Cited

U.S. PATENT DOCUMENTS 4,712,230 12/1987 Rice ...................................... 379/112
4,815,120 3/1989 Kosich .................................. 379/34

OTHER PUBLICATIONS

JSI Telecom J1066 Dial-Up Slave System Users Manual, undated.
JSI Telecom J1033C Dialed Number Recorder Users Manual, undated.
Discovery Technical Manual, published by Mitel Datacon, Issue 1, May, 1987.

Primary Examiner—Stafford D. Schreyer
Attorney, Agent, or Firm—Buchanan Ingersoll

[57] ABSTRACT

In a telephone monitoring system a number of telephone lines are simultaneously monitored by a single monitor unit which connects the respective voltage signals transmitted by the lines into input signals having a digital format to a corresponding number of personal computers or in the alternative to a mainframe computer which is accessible by a number of keyboards corresponding in number to the number of lines being monitored. An operator responds to the input signals from the telephone lines by entering comment data through the keyboard as the data corresponding to the input signals is simultaneously displayed on the screen associated with each keyboard. Each personal computer or the single mainframe is programmed to store, retrieve and analyze the data simultaneously received from the monitor and the respective keyboard. As the data is being processed it is displayed on the respective screen and/or is available in printed form from a printer linked through the monitor unit to each of the personal computers or the mainframe computer.

17 Claims, 2 Drawing Sheets

4,924,488

MULTILINE COMPUTERIZED TELEPHONE MONITORING SYSTEM

CROSS REFERENCE TO RELATED APPLICATION

This application is a continuation in part of application Ser. No. 078,593 filed 7-28-87, U.S. Pat. No. 4,815,120 entitled "Computerized Telephone Monitoring System".

BACKGROUND OF THE INVENTION

1. Field of Invention

The invention relates to a system for monitoring telephone calls, sometimes referred to as wiretap devices, and more particularly to a computerized system for simultaneously retrieving, analyzing and manipulating data collected from a plurality of telephone lines under wiretap surveillance.

2. Description of the Prior Art

Wiretap devices are designed to intercept and record telephonic data from a target telephone line. Two basic types of wiretaps are conducted using the same unit, operated in either DNR or T3 mode. One type of wiretap is known as dialed number recording (DNR) which records the number dialed, date, time and duration of the call. The second is called a Title III wiretap. This is the recording of the same information as the dialed number recording, but also allows for recording of actual conversations occurring on the target line.

The typical wiretap device does not record audio or conversational information. Rather, it prompts tape recorders to start upon pick-up of the telephone receiver and to stop upon the return of the receiver to the cradle. A typical wiretap device produces a hard copy of numerical data, using an adding machine tape, showing items such as case number, time of call, date, numbers dialed, whether the call is incoming or outgoing, origination of the call and whether or not tape recorders have been started and stopped.

More recently, wiretap devices have been created which include computer technology and microprocessing capabilities. These capabilities have been directed to enable more automatic interception and logging of calls by the device than was previously possible. In addition, they enable storage of the numerical information developed by the wiretap device. Frequently, an RS 232 port is provided which allows the user to dump the collected telephone data directly into a computer. The computer is treated as a register for the data to be analyzed through the use of a separate analysis program at a later time.

Wiretap devices can be connected directly to a target line or connected through a dial-up slave. A slave is a small device that can be attached to the target line in a remote location such as on telephone pole. A second telephone line is also connected to the slave from which the slave can draw power. The slave enables access to the target line at any distance from the monitoring point by way of a second telephone line. In operation the monitor dials the slave reaching it through the second telephone line and then receives information from the target line through the slave and second telephone line. Slave type connections are well known in the art. It should be understood that reference to a monitor being connected to a target line means that the connection may be direct or through a slave.

The role of the operator or user of the prior art systems is limited to simply hooking up the device to the appropriate telephone lines and monitoring activity. The laws of the United States provide that if the wiretap device is only collecting numerical data an operator need not be present while the device is in operation. However, if the wiretap device is activating tape recorders that are recording telephone conversations an officer must be present during the recording to avoid recording privileged information. The laws of the United States require that certain telephone conversations, such as those between an attorney and client, may not be recorded by the police authorities. If a recording is made, information collected by the wiretap may jeopardize the actual case in court proceedings. Consequently, the operator is always called upon to keep a log of notes pertinent to the investigation. He may be called upon to establish he was was not listening to any calls which were not tape recorded.

It is standard practice for the agency conducting the wiretap to provide a print-out of the numerical wiretap data from the wiretap system to a clerk/typist at headquarters. The clerk types the numerical data into a computer system which then has appropriate programming to allow data analysis. Additionally, the monitoring officer must prepare a contemporaneous log of the wiretap activities. Those notes are then typed at a later time frequently by someone other than the wiretap device operator. The report or log might identify particular phone numbers as belonging to a named individual, a drug dealer or a bookie. It also may describe the type of transaction conducted when a given number was called. The operator may also have notes about particular telephone conversations which he heard while the monitoring device was in operation.

During periods of inactivity, which are inevitable in an audio wiretap, there is little for an operator of the prior art devices to do. Consequently, he often spends that time reading books and doing other things not related to the surveillance operation. Since the operator is being paid for this time, it is desirable to have him do work related to the investigation such as analyzing the wiretap data that has been accumulated. However, presently available wiretap devices do not permit the operator during the surveillance to analyze the data collected.

There is a need for a multiline monitoring device which will enable the operator to simultaneously retrieve, analyze and manipulate data collected by a number of wiretap machines connected to an equal number of telephone lines. There is a further need for a wiretap system which will allow the gathering and analyzing of telephonic data from a number of telephone lines without requiring that the data be downloaded separately from each telephone line into another system.

There is also a need for a multiline monitoring system which will enable the operator to input data relevant to the surveillance operation while the monitoring device is in operation. Preferably that data should be capable of being reproduced in typewritten form. There is additional need for a wiretap system which will allow the operator to sort through and locate calls from a number of telephone lines by their conversational content while the monitor is simultaneously collecting data from a multiple of target lines. There is further need for a monitoring system which will enable the user to insert comments relating to the multi-wiretaps as the data is collected by the monitor.

SUMMARY OF THE INVENTION

In accordance with the present invention there is provided a telephone monitoring system that includes monitor means for attachment to at least one of a plurality of target telephone lines to simultaneously sense voltage changes on the lines and convert the voltage changes into data input capable of being stored. A number of computers are provided corresponding in number to the number of target telephone lines being sensed for voltage changes by the monitor means. Each of the computers has a memory unit with a program and a keyboard to allow an operator to input data into the memory. The computer memory unit is electrically connected to each computer through the monitor to the respective target telephone lines for the transmission of input data from the telephone lines to the monitor and therefrom to the computer memory unit. A processing unit associated with each of the computers receives and processes data from the monitor and the keyboard and develops responsive data by operation of the program contained in the memory unit. A display screen associated with each of the computers is connected to the processing unit, the keyboard and the memory unit. The display screen independently displays data entered through the monitor in response to the input data from the respective telephone lines and data entered from the keyboards and developed by the processing units.

Further in accordance with the present invention there is provided a method for simultaneously monitoring a number of target telephone lines comprising the steps of connecting a number of target telephone lines to a monitor for simultaneously transmitting thereto voltage signals corresponding to conversation transmitted by the target telephone lines. The voltage signals from each target telephone line are converted into a digital format. The digital format is transmitted as input data to a number of computers corresponding in number to the number of target telephone lines being monitored. The input data for each of the target telephone lines is simultaneously processed in accordance with a program contained in the memory of the computers. Responsive data is generated based on the input data and the responsive data is displayed on screens of the respective computers. The responsive data is stored in the memory of the respective computers. Additional data is inputted by an operator into the respective computers in response to input data processed by each computer and the responsive data displayed on each computer screen. Output data is displayed on each computer screen in response to the input data from the respective target telephone lines and the additional data inputted by the operator by operation of the program contained in the memory of the respective computers.

Accordingly, the principal object of the present invention is to provide a system for simultaneously monitoring a number of target telephone lines and processing data received therefrom by a computerized system that displays the data in a digital format and/or stores the data for later retrieval and simultaneous processing by input of additional data to the computers by an operator.

A further object of the present invention is to provide method and apparatus for simultaneously monitoring a number of target telephone lines and processing data received therefrom into a single computer for printout of the data in accordance with a program for selectively processing the data and permitting an operator to enter comments.

These and other objects of the present invention will be more completely disclosed and described in the following specification, the accompanying drawings, and the appended claims.

DESCRIPTION OF THE PREFERRED EMBODIMENTS

Figure 1:
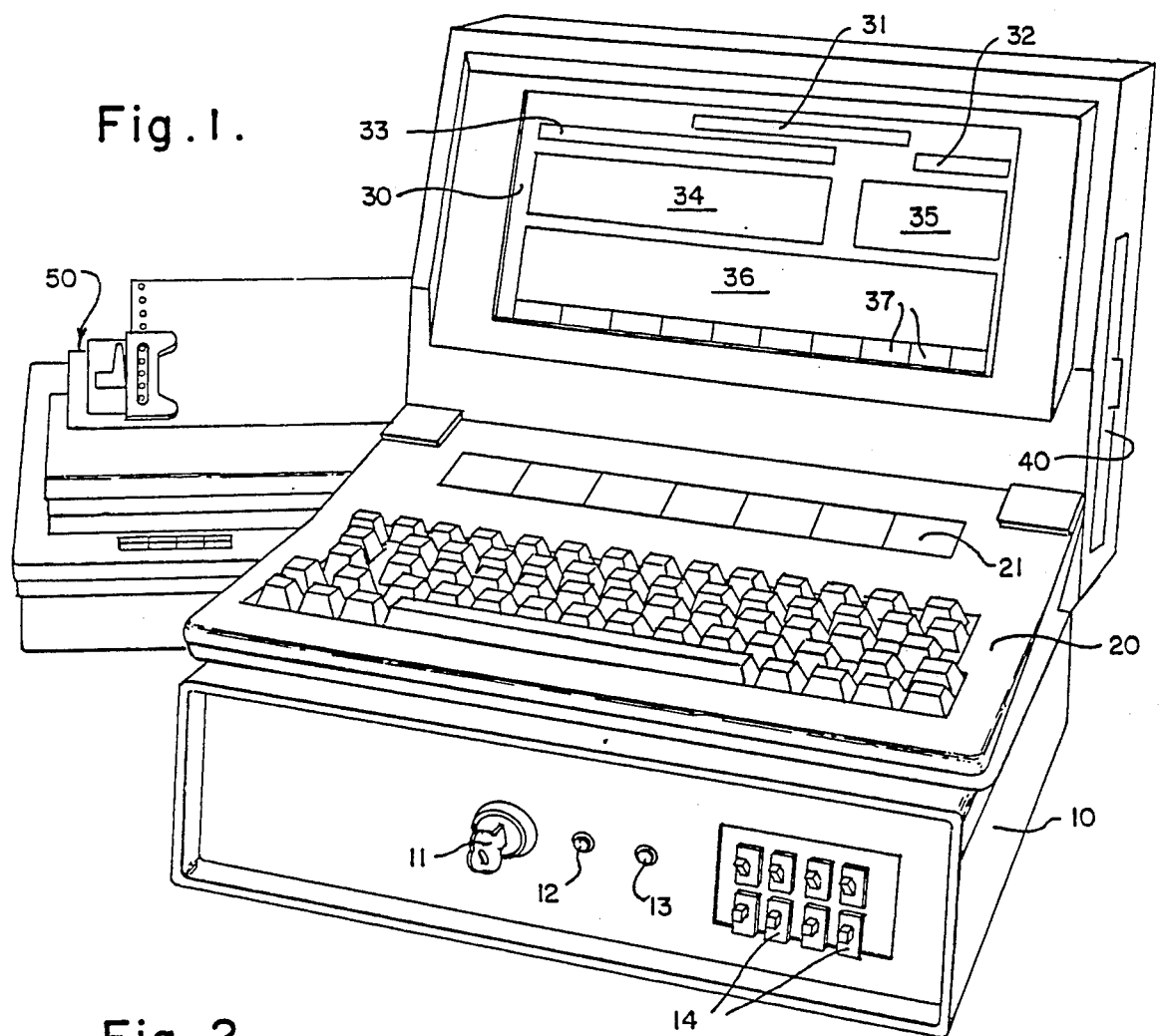
FIG. 1 is a perspective view of one embodiment of a telephone monitoring device.
Figure 3:
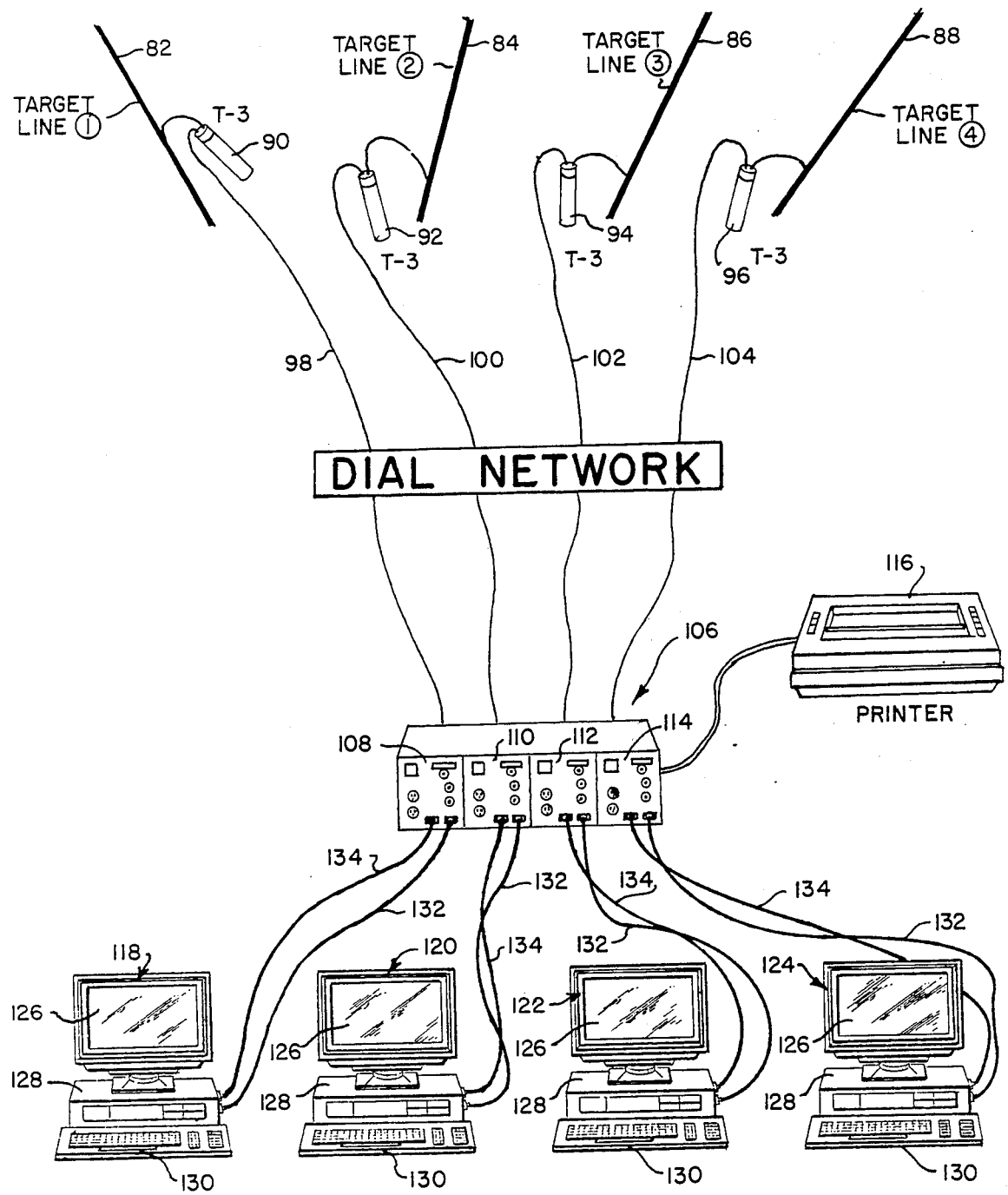
FIG. 3 is a schematic illustration of an embodiment of a system for monitoring multitelephone lines in accordance with the present invention.

Referring to the drawings, and particularly to FIG. 1, there is illustrated a monitor 10 which is suitable for attachment to a target line directly or through a slave (as shown in FIG. 3). The monitor translates voltage changes into data capable of being received and stored in a memory. The monitor 10 is utilized with an alphanumeric keyboard 20, a display screen 30, disc drive 40 and printer 50. Preferably a lock 11 in the monitor is used to turn the audio system on and off. Indicator lights 12 and 13 indicate whether power is on and whether the telephone on the target line is in use or "off hook". Preferably tape recorder operation is controlled from the alphanumeric keyboard 20 or via a keylock switch on the front panel of the monitor to turn tape recorders on and off and to turn a headpiece output on and off. The headpiece enables the operator to hear the conversation.

Keyboard 20 is an alphnumeric keyboard with additional function keys 21. These function keys enable the operator to create phrases or comments that can be stored in memory and recalled by pressing a function key. The screen 30 is configured so as to be able to report numerical data obtained by the monitor, as well as comment data entered by the operator. Preferably the phone number being monitored is displayed at the top of the screen as indicated by box 31. The date and time appear in the upper right hand corner in box 32. The number dialed by the target telephone and whether that telephone is on hook or off hook is reported in the upper left of the screen in box 33. Numerical data generated by the monitor is displayed in box 34. This data includes off hook time, on hook time, call duration, audio status and a sequence number identifying the call. Such information is not generally available on any prior art monitoring systems.

Alarm numbers, such as telephone numbers entered by the operator that have special significance, as for example the telephone number of the suspect's attorney, are displayed in box 35. A major portion of the screen 36 is devoted to reproduction of data stored and sorted by the system, as well as comments entered by the operator. This box can also be used to display case number, judge name and court number. Finally, boxes 37 are provided at the bottom of the screen which correspond to and identify the function keys 21.

In one embodiment of the present invention some of these keys are programed to stop the monitor, turn the audio on and off, turn the printer on or off, enter initial data, sort data, output screen and manual print in a short or long format. These designations appear in boxes 37 to indicate which key has each function. Preferably the function keys are programmed for STOP MONITOR, AUDIO ON/OFF, PRINT ON/OFF/SHORT/LONG, ENTER SPEC, EXIT SORT, OUTPUT SCREEN/PRINTER and MANUAL PRINT, ENTER REMARKS, ONLINE SORT, EDIT REMARKS, EDIT KEYBOARD, EDIT ALARMS.

The disc drive 40 is any drive suitable for holding a floppy disc onto which information from an internal memory 60 can be dumped. A printer 50 connected to the monitor 10, keyboard 20, and screen 30 prints out information displayed on screen 30, information developed by the monitor 10, even if it is not displayed on the screen, and information entered through the keyboard 20. Since comment information will be printed, the printer is preferably able to print at least eighty characters per line. Preferably, the printer has a continuous paper feed mechanism.

Figure 2:
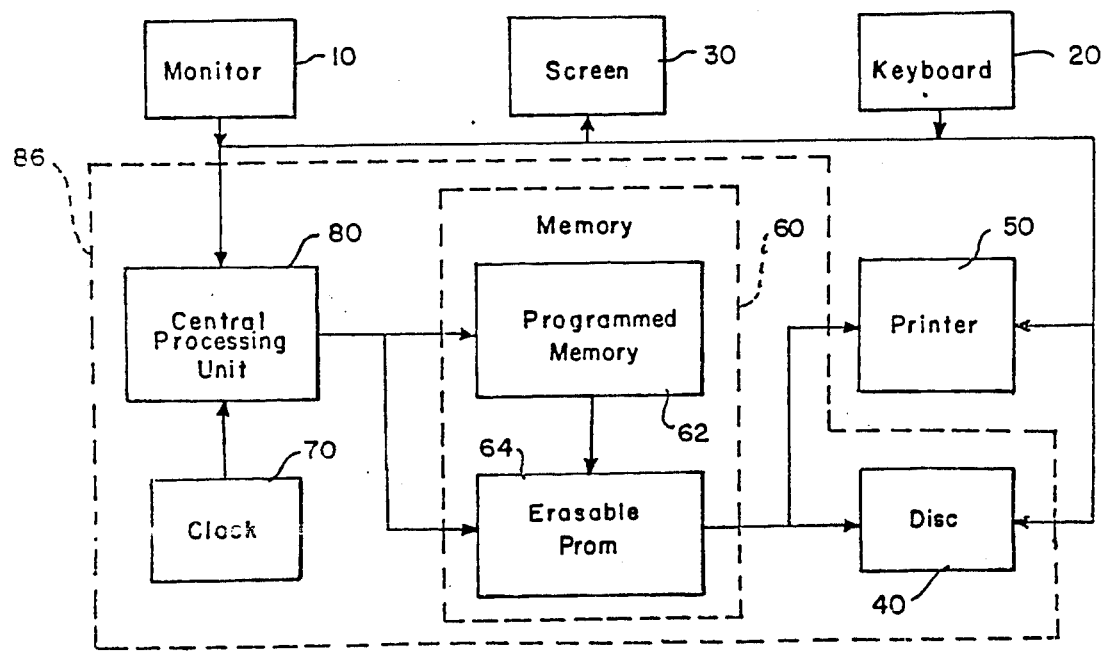
FIG. 2 is a block diagram illustrating the operation of the telephone monitoring device shown in FIG. 1.

Referring to FIG. 2, it is diagramatically illustrated that data obtained by the monitor 10 is transmitted as input through an RS-232 port to a central processing unit 80 and stored in memory 60. If desired, that same information can be displayed on the screen 30 as it enters the memory. Also, data can be entered through keyboard 20 passing through the central processing unit 80 into a memory 60. A clock 70 connected to the central processing unit 80 is programed to make time entries whenever data is entered either through the monitor 10 or the keyboard 20.

The memory 60 includes a programed memory 62 and an erasable programable memory 64. The memories 62 and 64 can be contained in one or more memory boards. The programed memory 62 contains a program for manipulating data received from the monitor 10 and the keyboard 20. The erasable memory 64 contains the data received from the monitor 10 and the keyboard 20. Preferably the memory 60 includes a buffer system which can receive data from the monitor 10 at all times. When the buffer is filled it will automatically dump the information to a disc contained in disc drive 40.

In operation the central processing unit 80, clock 70, memory 60, and disc drive 40 can be contained in a personal computer 81, such as the Zenith 171-42 computer having an upgraded 512K RAM. In such instances the monitor 10, keyboard 20 and printer 50 are connected through standard ports on that computer. A known printer adaptable for use in the present invention is an Okidata 182 printer. It is economical and sufficiently compact to contribute to overall system portability. The 182 printer can be upgraded with the addition of a tractor feed to accommodate standard computer paper. The overall system, as above described, can be packed in a flight storage case and easily set up for field use.

In operation the monitor unit 10 is first interconnected to the computer 81 and the computer 81 to the printer 50. The ring and tip of the target line are inserted into the provided push terminals (not shown) on the back panel of the monitor 10. If one desires a full audio wiretap, audio and remote terminals can be connected to the appropriate tape recorder inputs 14. At this point set up is complete and normally accomplished in five minutes or less.

To begin the monitoring process, the program disc is inserted into the front drive of the computer, and a formated or unformated data disc is placed in the rear drive. Then the computer is switched on. The computer screen will display three options:

1. START MONITOR
2. EDIT CASE FILE
3. EXIT TO DOS

To begin the monitor process, one would choose #1.

The screen will then ask for a file number, case number, judge number or name, and court number or name so the information to be stored o the data disc can be retrieved later. This information will appear as a heading on all printed reports generated regarding this file. Also, it should be noted these headings can easily be customized to fit any police procedure. This completes set up. The unit is now on line, usually in less than ten minutes.

At all times the computer screen will indicate call status, such as what numbers are being dialed by the target line, phone number being monitored, time off hook, time on hook, duration, audio status, alarm numbers and call number. Incoming calls are denoted by "Incoming".

At the bottom of the computer monitor screen the phrase "STOP MONITOR" to stop monitoring appears continuously. Having tracked calls for some periods of time, one may begin the sorting process by pressing the "ENTER SPEC" key, and the sorting criteria will appear in the comments frame of the computer screen. The agent then chooses the type search he would like to see. By choosing the appropriate option he will instantly be provided with a scrollable screen or hard copy of all calls which fit the search criteria while staying on line.

The system of the present invention creates a data base on all calls on the data disc. This data is available for manipulation by any number of analytical programs, again without any transcription necessary. The data diskette can also down load its calls to a larger mainframe data storage system for storage or analysis. The data diskette itself would be put into the case evidence file.

Now referring to FIG. 3, there is illustrated another embodiment of the wiretap device of the present invention in which a number of target telephone lines 82, 84, 86, and 88 are connected through respective slave units 90-96 to corresponding input lines 98-104 to a monitoring unit generally designated by the numeral 106. With this arrangement, a dial network is formed by which a plurality of target telephone lines can be simultaneously monitored by the single monitor unit 106.

The monitor unit 106 includes a plurality of individual monitor components 108-114 housed in a container where each component 108-114 is connected to the respective input lines 98-104. Thus the monitor unit 106 has the capability of simultaneously monitoring the conversations on the target telephone lines 82-88. In the same manner above described for monitoring a single target telephone line by the monitor 10, the monitor components 108-114 are operable to convert the voltage signals transmitted from the lines 82-88 through the slave units 90-96 to the input lines 98-104 into input signals having a digital format adaptable for computer processing.

Each of the monitor components 108-114 includes the identical features present on the monitor unit 10 described above and illustrated in FIG. 1, such as ring and tip poles for connection to each of the respective input lines 98-104, as well as lights for indicating whether power is on and whether the telephone on the respective target line being monitored is in use or "off hook". Further, each of the monitor unit components 108–114 includes the full audio wiretap, audio and remote terminals for connection to the tape recorder inputs of each unit.

As shown in FIG. 3, a single printer 116, corresponding to the printer 50 shown in FIG. 1, is provided for the monitor unit 106. With this arrangement, each of the components 108–114 shares the single printer 116. The unit 106 requires only one power supply and is equipped with a single AC plug extending from the housing of the monitor unit 106.

Connected to the components 108–114 of the monitor unit 106 are a number of individual computers 118–124, respectively. A commercially available computer adaptable for use with the present invention is the Zenith 171-42 personal computer above described, or any other make of personal computer programmed to retrieve, analyze and manipulate data collected from the respective target telephone lines. Each of the computers 118–124 includes the conventional components of a screen 126 connected to a central processing unit 128. A keyboard 130 is connected to both the screen 126 and the central processing unit 128. These components together with the respective components of the monitor unit 106 and printer 116 function in the same manner as the components for the computer shown in FIG. 2.

The central processing unit 128 is connected by an interface cable 132 through an RS-232 port to a respective one of the components of the monitor unit 106. Further each of the components 108–114 is connected by a printer cable 134 to the central processing unit 128 of each of the computers 118–124 respectively. With this arrangement, each of the computers is connected to the single printer 116 so that information displayed on each of the screens 126 and the information developed by the respective monitor components, even if it is not displayed on the screen and the information entered through the respective keyboards 130, can be printed.

With the above described monitor unit 106 a plurality of individual target telephone lines are monitored and data corresponding to the conversations conveyed is processed for each line through the monitor unit 106 by the individual computers 118–124. The signals transmitted through the target telephone lines 82–88 and slave units 90–96 are converted by the respective components 108–114 into a digital format that is in turn processed by the respective computers 118–124.

For example, a signal from target telephone line 82 is converted by the component 108 of unit 106 into a digital format and then transmitted through the interface cable 132 to the central processing unit 128 of computer 118. The digital format corresponding to the electrical signal transmitted through the telephone line 82 is processed in accordance with the program contained in the memory of the central processing unit 128, as above described with respect to the memory 60 for the central processing unit 80 shown in FIG. 2. In response to the input data from the component 108 responsive data is generated and displayed on the screen 126. At the same time, additional data can be inputted through keyboard 130 to the central processing unit 128 and displayed on screen 126 in response to the input data from the component 108.

As above described, the input from the monitor unit 106 can be displayed simultaneously with information entered by the processor through keyboard 130. Also, the central processing unit for each computer is operable to receive data collected by the respective components of the monitoring unit. Each central processing unit is programmed within its internal memory to permit the operator to sort the telephone information received from the respective line being monitored by telephone number or portion of a number, hour, call type, length of call, number of digits, date, and to allow a complete printout of all numerical information received from the monitor as above described.

The program operates to permit the information received from each component to be displayed on the respective screen and to be simultaneously stored in the memory of the CPU. As incoming data is being processed by each computer 118–124, an operator can enter data through the respective keyboard 130. At the same time the data being entered is displayed on the respective screen 126.

As a modification to the monitoring system above described and illustrated in FIG. 3, the individual personal computers 118–124 can be replaced by a single computer, such as a mainframe. The mainframe is connected to the monitor unit 106, shown in FIG. 3, through a single input port. Each keyboard and corresponding screen for each target line is connected to the mainframe. In this manner each component 108–114 of the monitor unit 106 transmits input data to the single mainframe computer.

The single mainframe computer transmits and receives data to and from each keyboard 130 and corresponding screen 126. With this arrangement the individual central processing units 128 are replaced by the mainframe computer. The data entered through each keyboard in response to the data displayed on the respective screen is processed by the mainframe computer. Also the mainframe computer is connected to the printer 116 through the monitoring unit 106. The printer 116 provides numerical printout of the input data from each target telephone line, the responsive data from the mainframe computer, and the additional data inputted by the operator. Also, it should be understood that in both applications of individual personal computers and a mainframe, the monitoring and recording of conversations on the number of target telephone lines can be remotely controlled.

Although I have described and illustrated certain present preferred embodiments of my system, it should be distinctly understood that my invention is not limited thereto but may be variously embodied within the scope of the following claims.

I claim:

1. A telephone monitoring system comprising,
   monitor means for attachment to at least one of a number of target telephone lines to simultaneously sense voltage changes on the lines and convert the voltage changes into data input capable of being stored,
   a number of computers corresponding in number to the number of target telephone lines being sensed for voltage changes by said monitor means,
   each computer having a memory unit with a program and a keyboard to allow an operator to input data into said memory,
   means for electrically connecting said computer memory unit of each computer through said monitor to the respective target telephone line for the transmission of input data from the telephone line to said monitor and therefrom to said computer memory unit,
   a processing unit associated with each computer for receiving and processing data from said monitor means and said keyboard to develop responsive data by operation of said program contained in said memory unit, and a display screen associated with each computer and connected to said processing unit, said keyboard, and said memory unit for independently displaying data entered through said monitor in response to the input data from the respective telephone lines and data entered from the keyboard and developed by said processing unit.

2. A telephone monitoring system as set forth in claim 1 which includes, a printer connected to said monitor means, and means for linking each computer through said monitor means to said printer.

3. A telephone monitoring system as set forth in claim 1 which includes, a central computer, and means for connecting said central computer to said monitor means to simultaneously receive and store for retrieval input data corresponding to the voltage changes transmitted by all of the target telephone lines.

4. A telephone monitoring system as set forth in claim 1 which includes, a central computer, and means for connecting said computers to said central computer for receiving and centrally storing for retrieval the input data received by each computer from said computer memory unit.

5. A telephone monitoring system as set forth in claim 1 in which, said monitor means includes a plurality of monitor components corresponding in number to the number of target telephone lines being monitored, and means for connecting each component to a respective one of said computers to transmit the input data from the target telephone lines for simultaneous processing by said computer processing units.

6. A telephone monitoring system as set forth in claim 5 which includes, a printer, and means for connecting said printer through each component to said computers to provide a printout of the input data received from the target telephone lines and of the data inputted through each of said keyboards to said components respectively.

7. A method for simultaneously monitoring a number of target telephone lines comprising the steps of, connecting a number of target telephone lines to a monitor for simultaneously transmitting thereto voltage signal corresponding to conversation transmitted by the target telephone lines, converting the voltage signals from each target telephone line into a digital format, transmitting the digital format as input data to a number of computers corresponding in number to the number of target telephone lines being monitored, processing simultaneously the input data for each of the target telephone lines in accordance with a program contained in the memory of the computers, generating responsive data based on the input data and displaying the responsive data on screens of the respective computers, storing the responsive data in the memory of the respective computers, inputting additional data by an operator into the respective computers in response to input data processed by each computer and the responsive data displayed on each computer screen, and displaying output data on each computer screen in response to the input data from the respective target telephone lines and the additional data inputted by the operator by operation of the program contained in the memory of the respective computers.

8. A method as set forth in claim 7 which includes, linking each of the target telephone lines through a corresponding slave unit to a monitoring unit for receiving the voltage signals from each target telephone line and converting the signals into the digital format.

9. A method as set forth in claim 7 which includes, connecting each of the computers to a single printer.

10. A method as set forth in claim 9 which includes, printing the input data received from the target telephone lines in digital form by the printer, and printing the additional data inputted by the operator and the data generated in response to the input data received from the target telephone lines.

11. A method as set forth in claim 7 which includes, individually monitoring each voltage signal coming from the respective target telephone lines, and providing a printout in a digital format corresponding the voltage signals while simultaneously processing the input data corresponding to the voltage signal.

12. A method as set forth in claim 7 which includes, simultaneously displaying on the screen of each computer the responsive data based on the input data from the respective target telephone lines and the additional data inputted by the operator in response to the input data.

13. A method as set forth in claim 7 which includes, processing the input data by each computer corresponding to the respective target telephone line and generating information from the respective target telephone line including the target telephone number, the telephone number being called, time and date of call, call type, and length of call, and printing out in numerical form the information generated.

14. A method for simultaneously monitoring a number of target telephone lines comprising the steps of, connecting a number of target telephone lines to a monitor for simultaneously transmitting thereto voltage signals corresponding to conversation transmitted by the target telephone lines, converting the voltage signals from each target telephone line into a digital format, transmitting the digital format from each target telephone line as input data to a mainframe computer, processing simultaneously the input data for each of the target telephone lines in accordance with a program contained in the memory of the mainframe computer, generating responsive data based on the input data and displaying the responsive data on a number of screens corresponding in number to the number of target telephone lines being monitored, storing the responsive data in the memory of the mainframe computer, inputting additional data by an operator into the mainframe computer in response to input data processed by the mainframe computer and the responsive data displayed on each screen, and displaying output data on each screen in response to the input data from the respective target telephone lines and the additional data inputted by the operator by operation of the program contained in the memory of the mainframe computer.

15. A method as set forth in claim 14 which includes,
connecting a keyboard to each screen and the mainframe computer, and
entering data through the keyboard in response to the data displayed on the respective screen and being processed by the mainframe computer.

16. A method as set forth in claim 14 which includes,
connecting the mainframe computer through the monitor to a printer by which a numerical printout of the input data from each target telephone line, the responsive data from the mainframe computer, and the additional data by the operator is printed.

17. A method as set forth in claim 14 which includes,
processing the input data from each target telephone line by the mainframe computer to generate a readout including target line telephone number, telephone number called, time and date of call, call type, and length of call.

* * * * *